United States Patent

[11] 3,586,944

[72] Inventors David Cooper
 Palos Verdes;
 Frank W. Parrish, El Segundo, both of, Calif.
[21] Appl. No. 13,313
[22] Filed Feb. 24, 1970
[45] Patented June 22, 1971
[73] Assignee International Rectifier Corporation
 Los Angeles, Calif.

[54] REVERSING CONTROLLER FOR DC MOTOR
 18 Claims, 10 Drawing Figs.
[52] U.S. Cl. .................................................... 318/258,
 318/293, 318/380
[51] Int. Cl. ........................................................ H02p 5/00
[50] Field of Search ............................................. 318/257,
 258, 293, 294, 341, 345, 379, 380

[56] References Cited
 UNITED STATES PATENTS
3,428,880 2/1969 Muller ...................... 318/257
3,249,838 5/1966 Mierendorf ................. 318/293
3,463,991 8/1969 Yuminaka et al ............ 318/258

Primary Examiner—Oris L. Rader
Assistant Examiner—K. L. Crosson
Attorney—Ostrolenk, Faber, Gerb and Soffen ABSTRACT: Controlled rectifiers are fired in selective groups in order to energize a DC motor for forward rotation, reverse rotation, motor stopping and motor stopping with dynamic braking. The control circuits for firing selected groups of controlled rectifiers are carried in respective modules, some of which are interchangeable and which provide electrical lockout for preventing energization of groups of controlled rectifiers until a particular sequence is completed. Forward and reverse operation of the motor and stopping of the motor are carried out with predetermined time delays.

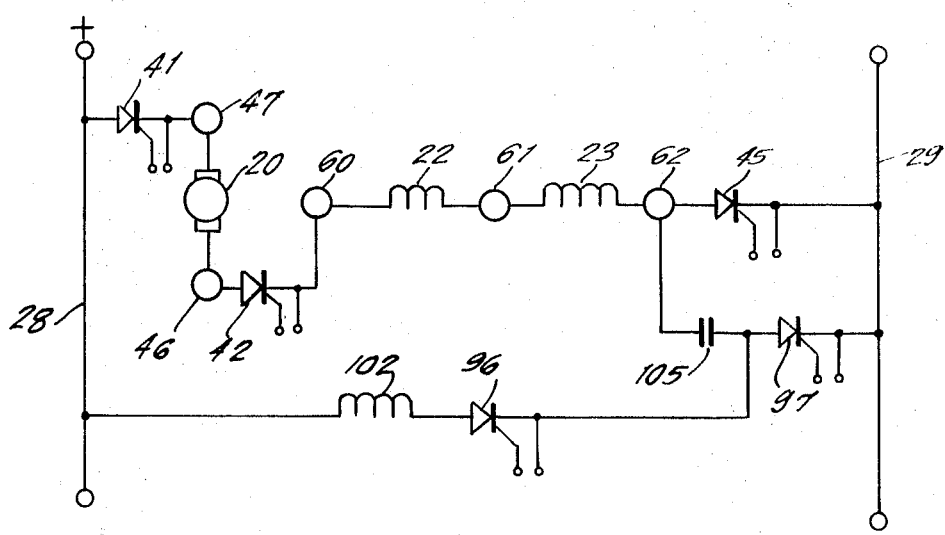
FIG. 1d
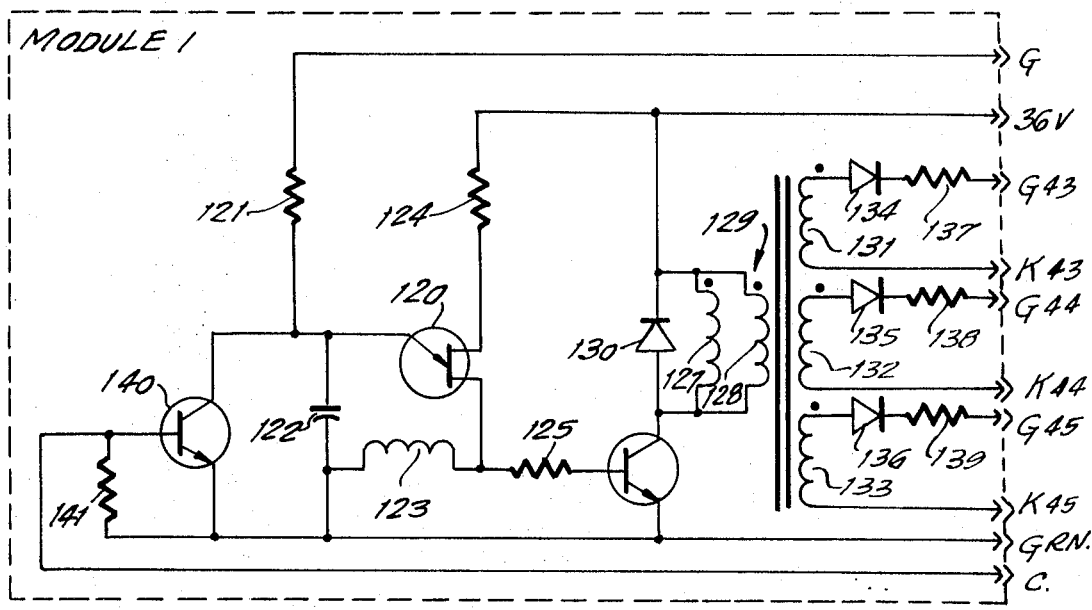
FIG. 2 (FORWARD TRIGGER)

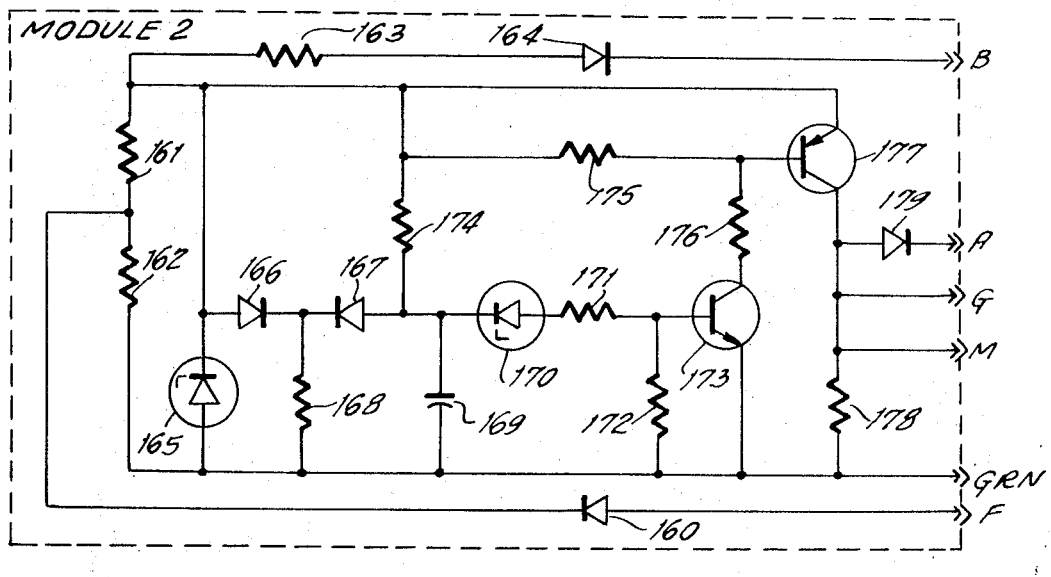
FIG.3. (FORWARD DELAY)
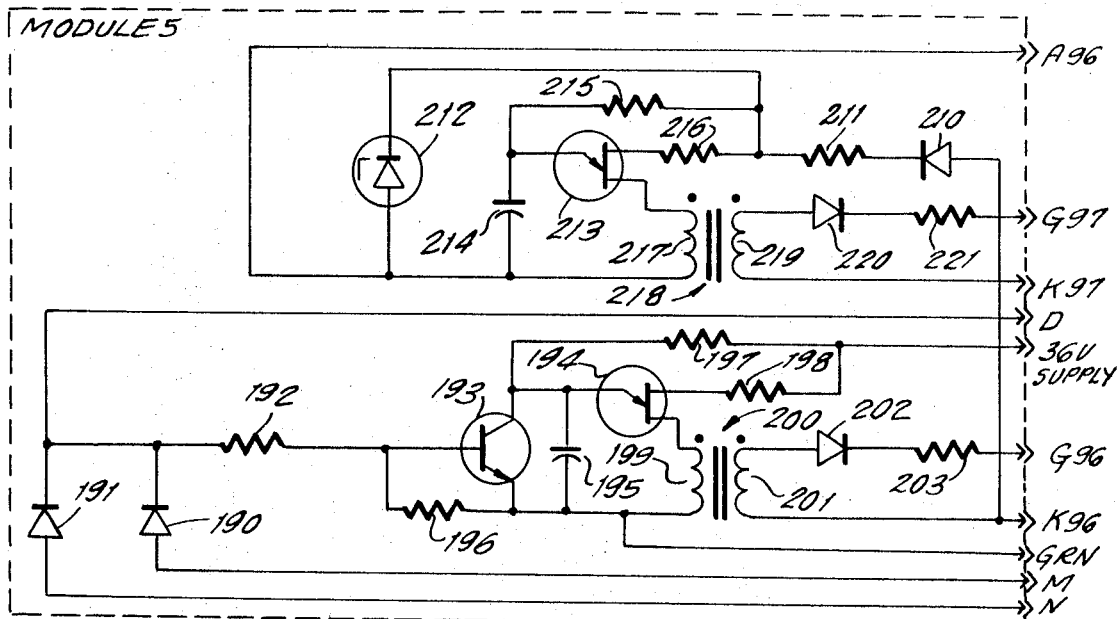
FIG.4. (COMMUTATION LOGIC)

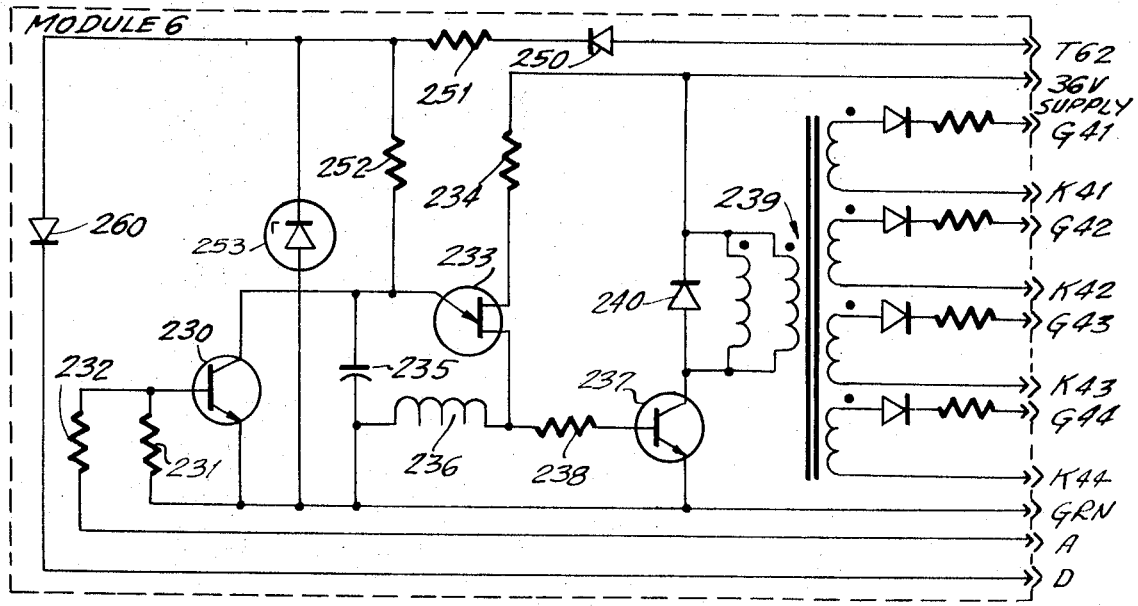
FIG. 5. (DYNAMIC BRAKE)
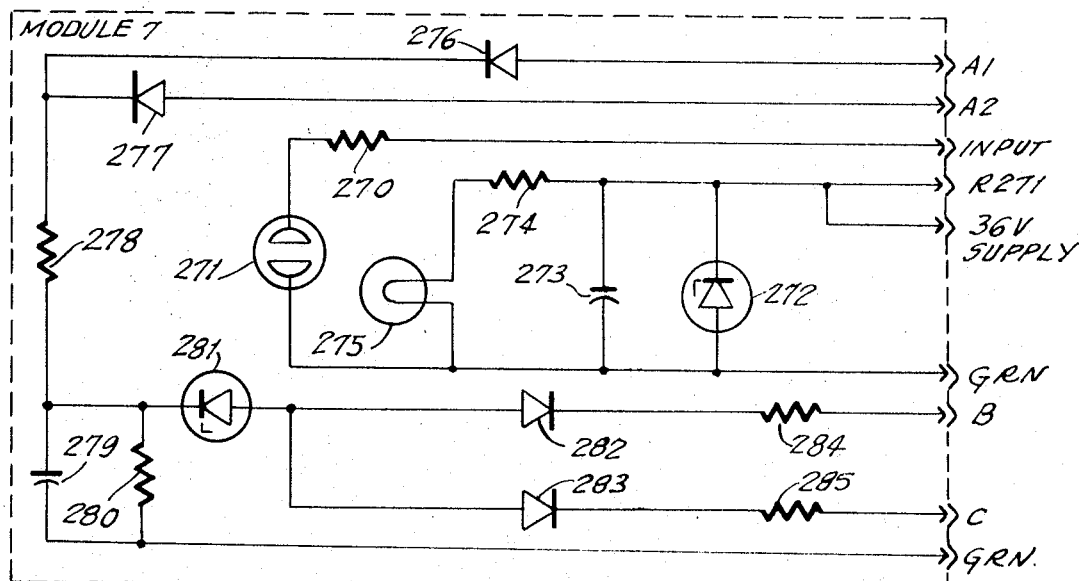
FIG. 6. (POWER SUPPLY)
INVENTORS
DAVID COOPER
FRANK W. PARRISH
BY
Ostrolenk, Faber, Gerb & Soffen
ATTORNEYS 3,586,944

1

REVERSING CONTROLLER FOR DC MOTOR

BRIEF DESCRIPTION OF INVENTION

This invention relates to DC motor control circuits, and more specifically relates to a novel DC motor control circuit constructed in modular fashion and using solid state components.

Motor control circuits for DC motors are well known and commonly use electrical contacting equipment, where the application of the equipment requires frequent starting, stopping and reversing. The contact life of the contactor equipment is considerably reduced because of this frequent operation, as is the life of the relaying control equipment.

Attempts have been made in the past to produce motor controllers for DC motors using solid state devices such as transistors to avoid contact erosion problems faced when using mechanical contacts. The solid-state circuits provided in the past, however, have not provided a complete replacement of the electrical contact equipment, nor have they provided the necessary reliability, simplicity and interchangeability of components which is provided by the present invention. Examples of such prior art motor controllers are found in U.S. Pat. No. 3,229,181 in which power transistors are used in circuit relation with an armature for the control thereof. Forced commutation turnoff of controlled rectifiers, which is necessary when using controlled rectifiers for solid-state controlled components, is also known and is shown in U.S. Pat. No. 3,335,351.

In accordance with the preset invention, solid-state components are used throughout the circuit and, in particular, controlled rectifiers are used as contrasted to transistor-type devices. A novel arrangement of control equipment is then provided in which the control circuitry for the various groups of controlled rectifiers are contained in separate modules, some of which are interchangeable, where these modules can, for example, be formed on separate circuit boards which are easily connected in circuit relation with one another and with the motor control circuit. These modules further provide a novel interlocking. Thus, a lockout arrangement and time-delay arrangement for the motor is provided which is the full equivalent of arrangements which have been previously obtained only with mechanical contactor systems. As a result, the equipment of the present invention can be directly interchanged with present contactor panels now in use and which are provided with mechanical controls and electrical contacts in the control system.

BRIEF DESCRIPTION OF DRAWINGS

FIG. 1d is a simplified diagram of FIG. 1 with the circuit arranged for motor stopping.

FIG. 2 is a circuit diagram of the forward and reverse trigger control modules of FIG. 1.

FIG. 3 is a circuit diagram of the forward and reverse delay modules of FIG. 1.

FIG. 4 is a circuit diagram of the commutation logic module of the circuit of FIG. 1.

FIG. 5 is a circuit diagram of the dynamic brake control module of FIG. 1.

FIG. 6 is a circuit diagram of the power supply and sensing module of FIG. 1.

2

STRUCTURE OF MOTOR CONTROL CIRCUIT

Figure 1:
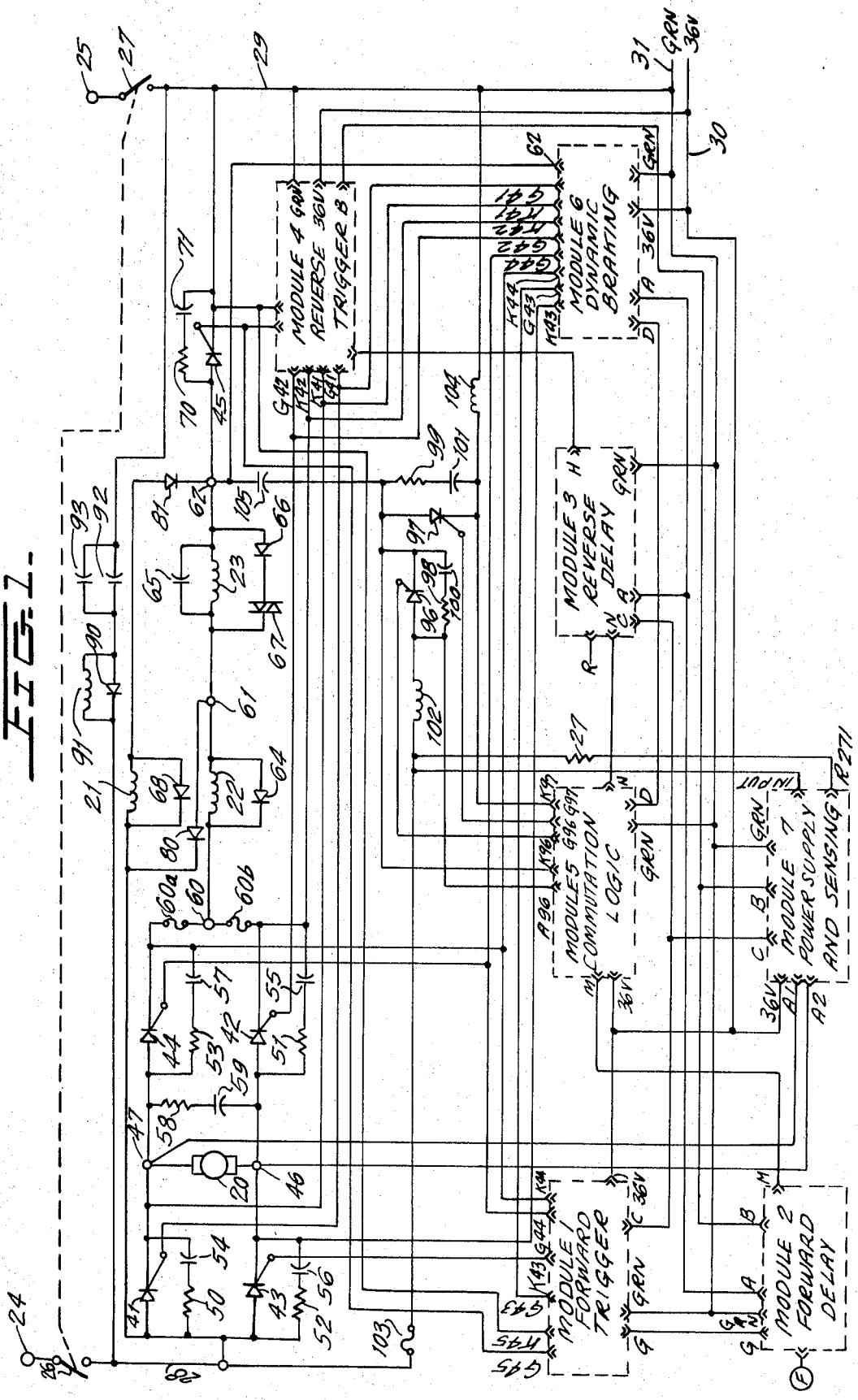
FIG. 1 is a circuit diagram of the complete circuit of the controller of the invention, with various control modules shown schematically.

Referring first to FIG. 1, there is shown a compounding wound DC motor which can, for example, be a five-horsepower motor and the basic circuit used to drive the motor in forward and reverse directions, and for stopping the motor, and for applying dynamic braking to the motor when power is shut off when the motor drives in a reverse direction. The motor of FIG. 1 consists of a motor armature 20, a shunt field winding 21 and a series field winding 22. The motor is further provided with a mechanical brake (not shown) operated by brake winding 23. A DC voltage bus is then provided to supply energy to the motor and consists, for example, of 265-volt bus conductors connected to bus terminals 24 and 25. Bus terminals 24 and 25 are then connected through disconnect switches 26 and 27, which are gauged, as indicated by the dotted line, to local conductors 28 and 29.

An auxiliary or control voltage source, to be later described, is provided and includes conductor 30 and ground conductor 31, shown at the bottom of FIG. 1.

The controller circuitry then includes five main controlled rectifiers connected between conductors 28 and 29 which control current flow through the motor armature and field windings. These include controlled rectifiers 41, 42, 43, 44 and 45. Controlled rectifiers 43 and 44 are poled to conduct in series with armature 20 when the motor is driven in a "forward" direction. That is, conventional current flow from terminal 46 to terminal 47, through armature 20 drives the motor in its forward direction. Controlled rectifiers 41 and 42 conduct when the motor is to be operated in its reverse direction.

Each of controlled rectifiers 41 to 44 are connected in parallel with respective series connected resistors and capacitors, including resistors 50 to 53 and capacitors 54 to 57. A series connected resistor 58 and capacitor 59 are connected in parallel with armature 20. Resistors and capacitors 50 to 57 limit rate-of-rise-of-voltage across their respective controlled rectifier, and provide a source of holding current after firing of their controlled rectifier and while the lagging current in the inductive motor circuit is increasing. The cathode terminals of controlled rectifiers 42 and 44 are then connected to terminal 60 through fuses 60a and 60b, respectively. Terminal 60 is connected in series with field winding 22, a terminal 61, mechanical brake 23, a terminal 62, and controlled rectifier 45.

A diode 64 is connected in parallel with field winding 22. Diode 64 limits reverse voltage due to L($di/dt$) in the series field 22 and provides a low resistance discharge path for the field current. Therefore, residual flux will persist for a longer time to insure effective dynamic braking, as will be later described. Note that a similar diode 68 is provided for the shunt field winding 21 for the same purpose.

Mechanical brake winding 23 is provided with a parallel capacitor 65, and is in parallel with series connected diode 66 and nonlinear resistor (thyrite) 67. These two components cause a delay in the decay of magnetic flux associated with the solenoid-operated mechanical brake and limit induced voltage in coil 23 to safe values. Capacitor 65 reduces the inductive effect of coil 23 during motor staring, thereby allowing the controlled rectifiers 41 to 45 quickly to reach their holding current values.

Controlled rectifier 45, like controlled rectifiers 41 to 44, is provided with a parallel circuit including resistor 70 and capacitor 71.

A diode 80 is then connected from terminal 61 to the left-hand side of winding 21, and a similar diode 81 is connected from terminal 62 to the right-hand side of winding 21. Diodes 80 and 81 are poled to form a closed circuit for conducting current through shunt field winding 21.

A further circuit extends between conductors 28 and 29 and includes parallel connected diode 90 and choke 91 (1 millihenry, for example), and the parallel connected capacitors 92 and 93. This circuit including choke 91 and large capacitor 93 minimizes the effects of line inductance and regulation.

Thus, diode 90 permits rapid discharge of large capacitor 93 in the event of an abrupt drop in line potential. Capacitor 92 provides a low impedance path to ground conductor 29 for line transients.

Two additional controlled rectifiers 96 and 97 are provided for use during motor stopping. Each is provided with a parallel circuit including resistors 98 and 99, respectively, and capacitors 100 and 101, respectively. The anode of controlled rectifier 96 is connected to conductor 28 through choke 102 (4 millihenrys, for example) and fuse 103. The cathode of controlled rectifier 97 is connected to ground conductor 29 through choke 104 (20 microhenrys). The anode of the controlled rectifier is connected to terminal 62 through capacitor 105.

OPERATION OF MOTOR CONTROL CIRCUIT

Figure 1A:
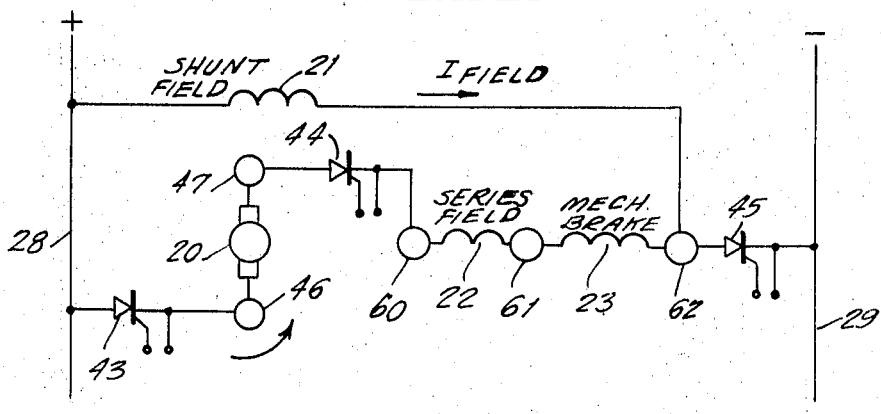
FIG. 1a is a simplified diagram of FIG. 1 with the circuit arranged for forward direction power flow.

The motor control circuit is operated by the selective firing of controlled rectifiers 41 to 45, 96 and 97. For example, where current flow through armature 20 is from terminal 46 to terminal 47, the motor will rotate in its forward direction. This is accomplished by causing controlled rectifiers 43, 44 and 45 to be conductive, while the other controlled rectifiers are nonconductive. The effective circuit is then the circuit shown in FIG. 1a which illustrates the current path for forward motor operation conditions with current flow extending from conductor 28 through controlled rectifier 43, armature 20, controlled rectifier 44, series field 22, the mechanical brake winding 23, controlled rectifier 45 and conductor 29. Current also flows through the shunt field winding 21 connected to controlled rectifier 45. It will be noted that the current flow through the mechanical brake winding 23 operates to release the mechanical brake from the motor so that rotation can take place in the usual manner.

Figure 1B:
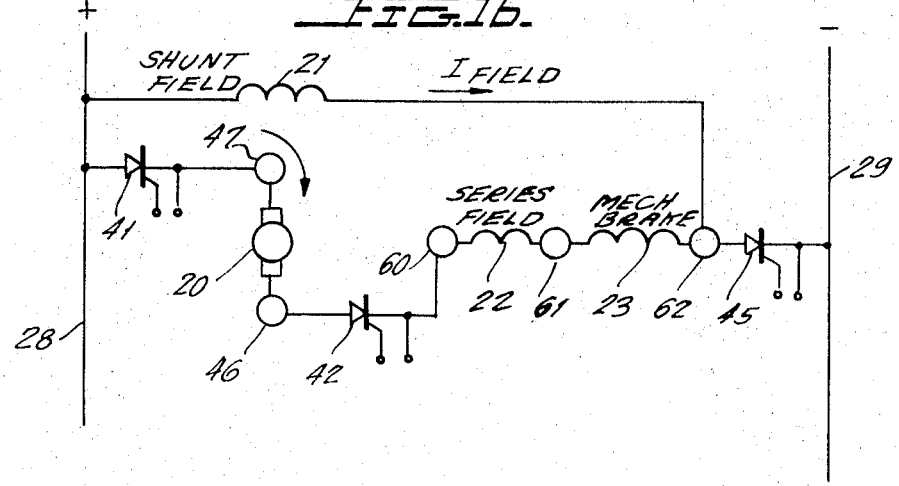
FIG. 1b is a simplified diagram of FIG. 1 with the circuit arranged for reverse direction power flow.

For rotation of the motor in the opposite direction or the reverse direction, and as shown in FIG. 1b, controlled rectifiers 41, 42 and 45 are caused to be conductive, while the remaining controlled rectifiers are extinguished. This causes the passage of current through armature 20 in a direction opposite to that shown in FIG. 1a so that rotation of the motor is in a reverse direction from that of FIG. 1a.

Figure 1C:
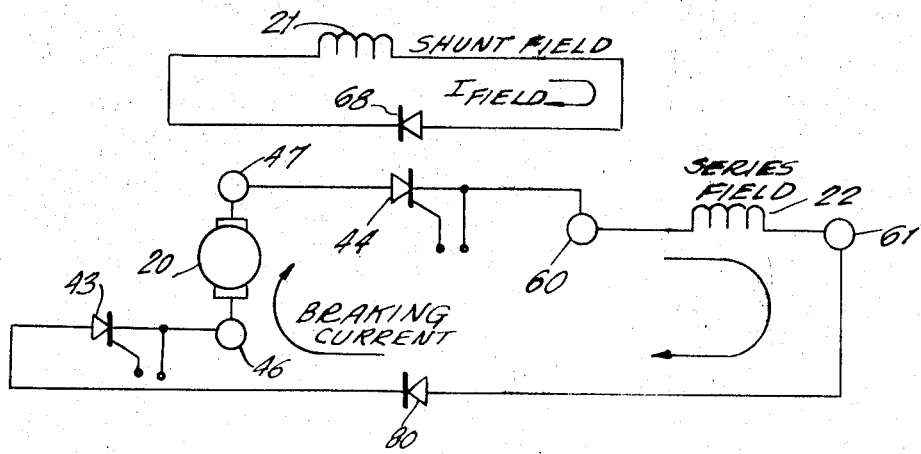
FIG. 1c is a simplified diagram of FIG. 1 with the circuit arranged for dynamic braking power flow.

FIG. 1c illustrates the power flow during dynamic braking following rotation of the motor in its reverse direction, as in FIG. 1b. Thus, in FIG. 1c controlled rectifiers 43 and 44 are conductive, while the remaining controlled rectifiers, and specifically controlled rectifier 45, is nonconductive. This forms a closed circuit for the flow of braking current driven by the electromotive force of motor armature 20. The flow of this braking current will create dynamic braking torque in the motor which will bring it to a rapid stop. This dynamic braking is substantially enhanced due to the residual current in the shunt field winding 21 flowing through the low resistance path of diode 68. The flow of the field current through diode 68 prolongs the current flow in the shunt field, thereby adding measurably to the dynamic braking torque. The braking current will continue to flow through the controlled rectifiers 43 and 44 until the motor comes to a complete stop.

FIG. 1d shows the general turnoff circuitry used for the motor controller of FIG. 1 where, in order to stop the motor, controlled rectifier 45 is shut off by commutation of its current to zero through the use of controlled rectifiers 96 and 97. More particularly, in FIG. 1d, controlled rectifiers 42, 44 and 45 are "on" and the motor has been operating in its forward direction. In order to stop the motor operation, controlled rectifier 96 is fired, thereby permitting the charging of capacitor 105 from conductor 28 through choke 102, controlled rectifier 96, and controlled rectifier 45. The inductive effect of choke 102 will cause capacitor 105 to charge to a relatively high voltage compared to the voltage of conductor 28, thereby back-biasing controlled rectifier 96 which will then assume a blocking condition. This back-biasing potential, as will be described later, causes energization of the gate circuit of controlled rectifier 97 and, after a given time delay (specifically a 400 microsecond delay) controlled rectifier 97 is fired so that capacitor 105 is discharged around the closed circuit, including controlled rectifier 97 and controlled rectifier 45. This causes the eventual reverse-biasing of controlled rectifier 45, causing it to cease conduction and to assume an "off" condition. Current continues to flow through controlled rectifier 97 until the potential of capacitor 105 goes through zero. The controlled rectifier 97 is then returned to its blocking state and the motor is stopped. Note that the circuit, including components 90, 91 and 93 of FIG. 1, is opened by the opening of disconnect contacts 26 and 27, if this is desired.

STRUCTURE OF CONTROL MODULES

The motor control function of the circuit of FIG. 1 was obtained by the firing of only selected groups of controlled rectifiers. This selective control is obtained under the control of circuits contained within various "modules," schematically shown in FIG. 1 as modules 1 to 7. These modules may be constructed using printed circuit board techniques, and the like.

TRIGGER MODULES

Module 1, termed a "forward trigger" module, is used to trigger control rectifiers 43, 44 and 45 into conduction to cause operation of the motor in its forward direction, as shown in FIGS. 1 and 2. Module 1 has output leads G43, G44 and G45 extending to the gate leads of controlled rectifiers 43, 44 and 45, respectively, and output leads K43, K44 and K45 extending to the cathode terminals of controlled rectifiers 43, 44 and 45, respectively.

Other terminals for module 1 are the ground lead GRN, the power supply terminal 36 v., where in the present embodiment, 36 volts was selected for the local power supply, a terminal G which is the firing signal input from module 2, and a terminal C which receives a safety lockout signal from module 7, as will be later described.

In order to fire controlled rectifiers 43, 44 and 45, a DC signal is connected to terminal G and is connected to the control electrode of trigger transistor 120 through resistor 121 and capacitor 122. A choke 123 (150 microhenrys) is connected between capacitor 123 and the lower base of transistor 120. The output circuit of transistor 120 includes power supply 36 v., resistors 124 and 125 and the base of transistor 126. The output circuit of transistor 126 is connected in series with parallel primary windings 127 and 128 of pulse transformer 129. A diode 130 is connected in parallel with windings 127 and 128. Secondary windings 131, 132 and 133 of pulse transformer 129 are connected in series with diodes 134, 135 and 136, respectively, and gate current limiting resistors 137, 138 and 139, respectively.

Module 1 operates such that a signal applied to terminal G turns on transistor 120 which, in turn, turns on transistor 126. This permits a sharp pulse current to flow through windings 127 and 128 whereby a positive pulse is applied to the gates of controlled rectifiers 43, 44 and 45, initiating forward motor operation.

Once the motor is operating in its forward direction, it is desirable to prevent generation of further gate signals from terminals G43, G44 and G45 until the motor comes to a complete stop and the energy in the motor circuit has been largely dissipated. To this end, transistor 140 is connected to the control electrode of trigger transistor 120. Transistor 140 is connected with resistor 141 and is made conductive by a base signal from terminal C which is obtained from module 7, as will be later described. This acts as a lockout signal, rendering transistor 120 inoperative until the base signal at terminal C is removed.

Reverse trigger module 4 is identical to the forward trigger module of FIG. 2, and the modules are interchangeable. However, its output are connected to different controlled rectifiers. Thus, as shown in FIG. 1, the gate and cathode output leads are shown as G42—K42 for controlled rectifier 42 and G41—K41 for controlled rectifier 41. Note that these are the terminals of FIG. 2 which were used for controlled rectifiers 44 and 43, respectively. Moreover, in FIG. 1, terminal B of module 4 corresponds to terminal C and locks out the subsequent firing of controlled rectifier 41, 42 and 45 until such time as permitted by module 7. Finally, the firing signal for module 4 is applied to terminal H, from module 3, where terminal H corresponds to terminal G in FIG. 2.

DELAY MODULES

Turning next to the forward and reverse delay modules 2 and 3, respectively, it will be seen that these modules are each identical to one another and are interchangeable wit one another. The forward delay module is shown in detail in FIG. 3.

In order to operate the motor in the forward direction, the forward delay module is provided with an input terminal F to which is applied a DC voltage of some given magnitude from a source, not shown. The application of a positive going DC voltage to terminal F will cause the motor to operate in the forward direction. The terminal R of module 3 serves the same purpose for the reversed motor rotation where again DC voltage is applied to terminal R of module 3 (having the identical circuit shown for terminal F in FIG. 3) when the motor is to be operated in the reverse direction. The forward delay module of FIG. 3 is further provided with a ground terminal, terminal B, which is connected to corresponding terminal B of module 4, terminal A, which delivers an output to disable the dynamic braking module when a forward or reverse voltage signal is applied to terminals F or R, an output terminal G, which is connected to the input of module 1, and an output terminal M, which is connected to terminal M of the commutation logic module 5.

The reverse delay module 3 of FIG. 1 has equivalent terminals and includes the terminal N connected to terminal N of commutation module 5, which is identical in circuit to the circuit extending to terminal M of FIG. 3. Similarly, module 3 is provided with terminal C in place of terminal B of FIG. 3 were terminal C is connected to the forward trigger for disabling the forward trigger during reverse operation and a terminal H in place of terminal G of FIG. 3 where terminal H delivers the firing signal to the reverse trigger module 4.

The circuit of FIG. 3 includes an input diode 160 which is connected to the junction between resistors 161 and 162. A circuit extends from the top of resistor 161 through resistor 163 and diode 164 to terminal B. Therefore, so long as an output voltage is provided at terminal F, an output voltage will appear at terminal B, which will, in turn, lockout reverse trigger module 4. That is, it will not be possible to fire-controlled rectifiers 41, 42 or 45 from the pulse transformer firing circuit of module 4 since this pulse transformer is inactivated. This condition exists so long as the forward signal is applied to terminal F. A zener diode 165 is connected across an input circuit including diodes 166 and 167, resistor 168 and capacitor 169. Capacitor 169 is connected across zener 170 and in series with base current limiting resistor 171 and resistor 172 to the base of transistor 173. The circuit connected to transistor 173 further includes resistors 174, 175 an 176 with the junction between resistors 175 and 176 connected to the base of transistor 177. The emitter of transistor 177 is connected to the top of zener 165 with transistor 177 becoming conductive through resistor 178, thereby to apply signals at terminals A, G and M when transistor 173 becomes conductive The operation of the forward delay module of FIg. 3 (and of the reverse trigger module 4 as well) is that, upon the application of a signal to terminal F, the voltage across capacitor 169 begins to increase at a rate determined by the time constant of capacitor 169 and its respective resistors 161 and 174. After a given time delay, the potential at the top of resistor 172 becomes sufficiently high to cause conduction of transistor 173, thereby decreasing the potential of the base of transistor 177 so that transistor 177 conducts. This, in turn, applies potential to terminals A, G and M, whereby a firing signal is applied to the forward trigger module 1 through the terminal G. The commutation logic module receives a signal from terminal M and the dynamic braking system is disabled over terminal A. Note that the reverse trigger module is immediately locked out, without time-delay by the signal immediately appearing at terminal B. This prevents the possibility of the firing of all of controlled rectifiers 41 to 44 which would present a short circuit across the motor. The forward turn-on delay selected for the above-noted circuit is 33 milliseconds maximum. The reverse turn-on delay is similarly 33 milliseconds maximum.

As will be seen more fully hereinafter the turnoff delay is 63 milliseconds maximum, the dynamic braking delay after turnoff is 2.5 milliseconds, the change of direction delay from reverse direction to forward direction and from forward to reverse direction are each about 96 to 98 milliseconds.

TURNOFF OR COMMUTATION LOGIC MODULE

MOdule 5 is illustrated in FIG. 4 and is the module which controls motor stopping or turnoff. More particularly, the commutation logic module 5 accomplishes the firing of controlled rectifiers 96 and 97 in the manner shown in FIG. 1d when the motor is to be stopped. Stopping of the motor is obtained when no signal is applied to the terminal F of module 2 or terminal R of module 3. That is, the absence of a motor operating signal causes motor stopping. If there is either a forward or reverse signal applied to terminals F or R of modules 2 or 3, there will be an input to terminals M or N, respectively, of module 5. These inputs to terminals M and N are then conducted, respectively, through diodes 190 and 191 through resistor 192 to the base of transistor 193. Thus, so long as there is a signal on either terminal M or N, transistor 193 conducts and the oscillator circuit which includes trigger transistor 194, capacitor 195, resistors 196, 197 and 198 and the primary winding 199 of pulse transformer 200 will not operate. However, once a signal is removed from both terminals M and N, the oscillator circuit, including transistor 194, oscillates, thereby generating a pulse in secondary winding 201 of pulse transformer 200. This then applies a pulse through diode 202 and resistor 203 to the gate terminal of controlled rectifier 96, thereby firing controlled rectifier 96. The firing of controlled rectifier 96, as described in connection with FIGS. 1 and 1d, causes the charging of capacitor 105. Once the capacitor 105 is sufficiently charged, controlled rectifier 96 turns off because of rapid rise in the cathode voltage of controlled rectifier 96. This high voltage, due to capacitor 105, is then used in the commutation logic module to subsequently fire-controlled rectifier 97.

This, as shown in FIG. 4, the output lead connected to terminal K96 is connected through diode 210 to the firing circuit connected to terminals G97 and K97 for firing controlled rectifier 97. This circuit includes resistor 211, zener diode 212 and terminal A96 connected to the anode of controlled rectifier 96. The regulated voltage appearing across zener 212 is then applied to the oscillator circuit which includes trigger transistor 213, capacitor 214, resistors 215 and 216 and the primary winding 217 of pulse transformer 218. The secondary winding 219 of pulse transformer 218 is connected to the gate and cathode terminals of controlled rectifier 97 through the diode 220 and resistor 221. Accordingly, when controlled rectifier 96 turns off and the potential on terminal K96 becomes sufficiently high, the oscillator circuit including trigger transistor 213 oscillates, thereby generating a pulse train in secondary winding 219 which fires controlled rectifier 97. The firing of controlled rectifier 97 then permits the discharge of capacitor 105, which commutates down the current in controlled rectifier 45, thereby extinguishing controlled rectifier 45. Controlled rectifier 97 is subsequently extinguished after the discharge of capacitor 105. Therefore, the current in the main motor path is, in effect, interrupted at the ground or negative conductor 29.

The commutation logic module 5 of FIG. 4 is further provided with a terminal D connected through resistor 192 to the base of transistor 193. As will be seen in FIG. 5, terminal D is connected to terminal 62 of FIG. 1 and to the anode of controlled rectifier 45. Therefore, after the controlled rectifier 45 is turned off during the commutation mode described above, the potential of terminal 62 will assume the potential of line 28 and this potential will be applied to terminal D in FIG. 4 and thence to transistor 193. Thus, the transistor 193 is made conductive, thereby disabling transistor 194 after the motor stop sequence has been applied.

A stop signal which has an automatic delay adjustable from 450 milliseconds to 15 seconds is provided to provide time for the motor to switch between its forward and reverse directions. This is obtained from the feedback signal from armature 20, connected to terminals A1 and A2 of the power supply module of FIG. 6. A suitable time delay is then provided by the RC circuit comprised of resistor 278 and capacitor 279. The time delay can be adjusted by proper selection of either of these components, or can be variable by making either or both of the components variable.

DYNAMIC BRAKING MODULE

Referring next to FIG. 5, there is shown therein the circuit module 6 used for dynamic braking. Module 6 has the various outputs illustrated to initiate operation of the controlled rectifiers, as previously indicated in connection with FIG. 1c.

The circuit of dynamic braking module 6 of FIG. 5 is similar in many respects to the circuit of the forward trigger module of FIG. 2. Thus, the circuit is provided with a lockout transistor 230 and its input resistor 231 and 232 where resistor 232 is connected to terminal A. Terminal A is, in turn, energized from modules 2 and 3. Therefore, as long as a forward or reverse control signal is applied to terminals R and F, a signal will appear at terminal A, causing the conduction of transistor 230 which will cut off any output from the dynamic braking module. Thus, the output of transistor 230 is used to cut off trigger transistor 233 where the trigger transistor 233 is associated with resistor 234, capacitor 235 and choke 236 (270 microhenrys). The output of trigger transistor 233 is then connected, as was the case of the circuit of FIG. 2, to transistor 237 through the resistor 238. Transistor 237 is then connected in series with the parallel primary winding of pulse transformer 239 and diode 240 such that the conduction of transistor 237 causes the energization of pulse transformer 239 so that high current pulses are induced in the secondary winding thereof for application to the indicated cathodes and gates of the various controlled rectifiers.

As pointed out previously, so long as there is a forward or reverse signal applied to the motor control circuit, dynamic braking is inactivated by the conduction of transistor 230. During the motor stopping sequence, there is neither a forward nor a reverse signal so that the circuit can be operated when the control electrode of trigger transistor 233 receives a suitable biasing signal. This biasing signal is obtained from terminal T62 connected to the anode of controlled rectifier 45 of FIG. 1 and connected through diode 250 and resistors 251 and 252 to the trigger electrode of transistor 233. Thus, during the stopping sequence, as soon as controlled rectifier 45 has been turned off, the potential of point 62 begins to approach the potential of line 28. At this point, the signal applied to the trigger terminal of trigger transistor 233 becomes sufficiently high to fire transistor 233, which causes output pulses to appear between the gates and cathodes of controlled rectifiers 43 and 44. This brings into play the dynamic braking action described above in connection with FIG. 1c.

It will be noted that module 6 of FIG. 5 further includes a diode 260 which is connected from terminal T62 to terminal D, which is subsequently connected to terminal D of module 5, shown in FIG. 4, and which was previously described.

POWER SUPPLY AND SENSING MODULE

FIG. 6 illustrates the circuit of the power supply and sensing module 7. Referring to FIG. 6, the input line voltage from line 28 is connected to the input terminal through resistor 270 and indicator lamp 271 which indicates the presence of line potential. A resistor 271 (FIG. 1) is then connected to line 28 and to terminal R271 and is then connected across a zener diode 272 which establishes the 36 volt output for the 36 volt local supply. In parallel, the zener diode 272 is a capacitor 273, which is connected in series with resistor 274 and a lamp 275 which indicates that the presence of the 36 volt supply is operative.

Module 7 is further provided with terminals A1 and A2 which, as seen in FIG. 1, are connected to motor terminals 47 and 46, respectively. Therefore, so long as the motor is operated in either its forward or reverse direction, a potential is applied to terminals A1 or A2 and this potential is applied through diode 276 or 277, respectively, to resistor 278 and capacitor 279. The voltage across capacitor 279 is then applied to resistor 280 and zener diode 281 which, in turn, applies a potential to diodes 282 and 283 and their series resistors 284 and 285, respectively, and to terminals B and C, respectively. It will be recalled that terminals B and C of modules 2 and 3, respectively, serve to block out the operation of these modules by preventing the application and further firing pulses to their respective controlled rectifiers until the motor has been deenergized.

Although this invention has been described with respect to its preferred embodiments, it should be understood that many variations and modifications will now be obvious to those skilled in the art, and it is preferred, therefore, that the scope of this invention be limited not by the specific disclosure herein, but only by the appended claims.

We claim:

1. A motor control circuit for a reversible DC motor; said reversible DC motor having an armature and a field winding means; said motor control circuit including a main source of DC power and first, second, third, fourth and fifth controlled rectifiers; each of said controlled rectifiers having anode, cathode and control electrode terminals; said armature having first and second terminals; the anode electrode of said first and the cathode electrode of said second controlled rectifiers connected to said first and second terminals of said armature, respectively, the anode electrode of said third and the cathode electrode of said fourth controlled rectifiers connected to said second and first terminals of said armature, respectively; said cathode electrodes of said first and third controlled rectifiers connected to one another; said anode electrodes of said second and fourth controlled rectifiers connected to one another; said fifth controlled rectifier connected in series with each of said first to fourth controlled rectifiers and conducting forward current in the same direction as said first to fourth controlled rectifiers; circuit means connecting said field winding means, fifth controlled rectifier and main source DC power in series; said main source of DC power connected in series with said first to fourth controlled rectifiers and said fifth controlled rectifier; whereby conduction of said first, second and fifth controlled rectifiers produces rotation of said motor in one direction, and whereby conduction of said third, fourth and fifth controlled rectifiers produces rotation of said motor in an opposite direction to said one direction; and gate signal generating means connected to said control electrode terminals for generating firing signals for firing said first to fifth controlled rectifiers in given groups.

2. The circuit of claim 1 which includes commutation turnoff circuit means for turning-off said fifth controlled rectifier while power is connected to said armature from said source of DC power.

3. The motor control circuit of claim 1 wherein said field winding means includes a series field winding in series with each of said first to fifth controlled rectifiers and a shunt field winding in parallel with said first to fourth controlled rectifiers and in series with said fifth controlled rectifier.

4. The circuit of claim 1 which includes a mechanical brake winding in series with said fifth controlled rectifier.

5. The circuit of claim 1 wherein each of said first to fifth controlled rectifiers have respective series connected resistors and capacitors in parallel therewith.

6. The circuit of claim 1 which includes across said source of DC power, for line voltage regulation, a parallel connected diode and choke in series with a parallel connected large capacitor and small capacitor.

7. The control circuit of claim 1 which includes firing circuit means for firing, in groups, a first group including said first, second and fifth controlled rectifier; and a second group including said third, fourth and fifth controlled rectifier; said firing circuit means including first and second input circuits for firing said first and second groups responsive to the connection of respective continuous input signals thereto; said firing circuit means including time-delay means for firing said first and second groups with a given time-delay following the application of input signals to said first and second input circuits.

8. The circuit of claim 2 wherein said commutation circuit includes a capacitor and sixth and seventh controlled rectifiers; said sixth and seventh controlled rectifiers connected in series with one another and with said source of DC power; said capacitor connected in closed series circuit with said source of DC power, said sixth controlled rectifier and said fifth controlled rectifier; and firing circuit means connected to the control electrodes of said sixth and seventh controlled rectifier for firing said sixth controlled rectifier while said fifth controlled rectifier is conducting, thereby to charge said capacitor through said fifth controlled rectifier, and thereafter to fire said seventh controlled rectifier, thereby to discharge said capacitor through said seventh controlled rectifier and in the reverse direction of said fifth controlled rectifier, thereby to extinguish said fifth controlled rectifier.

9. The circuit of claim 3 which includes respective diodes in parallel with said series winding and said shunt winding; said diodes being poled in opposition to the forward current-carrying direction of said fifth controlled rectifier.

10. The circuit of claim 3 which further includes a diode connected in parallel with the series connection of said first to fourth controlled rectifiers and said series field winding for carrying a circulating current through said armature and series field winding to obtain dynamic braking when said fifth controlled rectifier is made nonconductive.

11. The circuit of claim 4 which includes a series connected diode and thyrite resistor in parallel with said mechanical brake winding; said diode being poled in opposition to the forward current-carrying direction of said fifth controlled rectifier.

12. The control circuit of claim 7 which further includes lockout circuit means connected to said firing circuit means for preventing the firing of one of said groups while the other is conducting.

13. The control circuit of claim 8 which includes firing circuit means for firing, in groups, a first group including said first, second and fifth controlled rectifier; and a second group including said third, fourth and fifth controlled rectifier; said firing circuit means including first and second input circuits for firing said first and second groups responsive to the connection of respective continuous input signals thereto; said firing circuit means including time-delay means for firing said first and second groups with a given time-delay following the application of input signals to said first and second input circuits.

14. The circuit of claim 8 wherein said field winding means includes a series field winding in series with each of said first to fifth controlled rectifiers and a shunt field winding in parallel with said first to fourth controlled rectifiers and in series with said fifth controlled rectifier.

15. The circuit of claim 9 which includes a mechanical brake winding in series with said fifth controlled rectifier; and which further includes a series connected diode and thyrite resistor in parallel with said mechanical brake winding; said diode being poled in opposition to the forward current-carrying direction of said fifth controlled rectifier.

16. The circuit of claim 10 wherein a diode is connected in parallel with said shunt winding and permits the decay of the shunt winding energy therethrough during dynamic braking.

17. The control circuit of claim 12 which includes firing circuit means for firing, in groups, a first group including said first, second and fifth controlled rectifier; and a second group including said third, fourth and fifth controlled rectifier; said firing circuit means including first and second input circuits for firing said first and second groups responsive to the connection of respective continuous input signals thereto; said firing circuit means including time-delay means for firing said first and second groups with a given time-delay following the application of input signals to said first and second input circuits.

18. The circuit of claim 14 which further includes a diode connected in parallel with the series connection of said first to fourth controlled rectifiers and said series field winding for carrying a circulating current through said armature and series field winding to obtain dynamic braking when said fifth controlled rectifier is made nonconductive.